Oct. 13, 1936.  W. M. SINK  2,057,252
FOLDING TENT HOUSE
Filed May 7, 1935
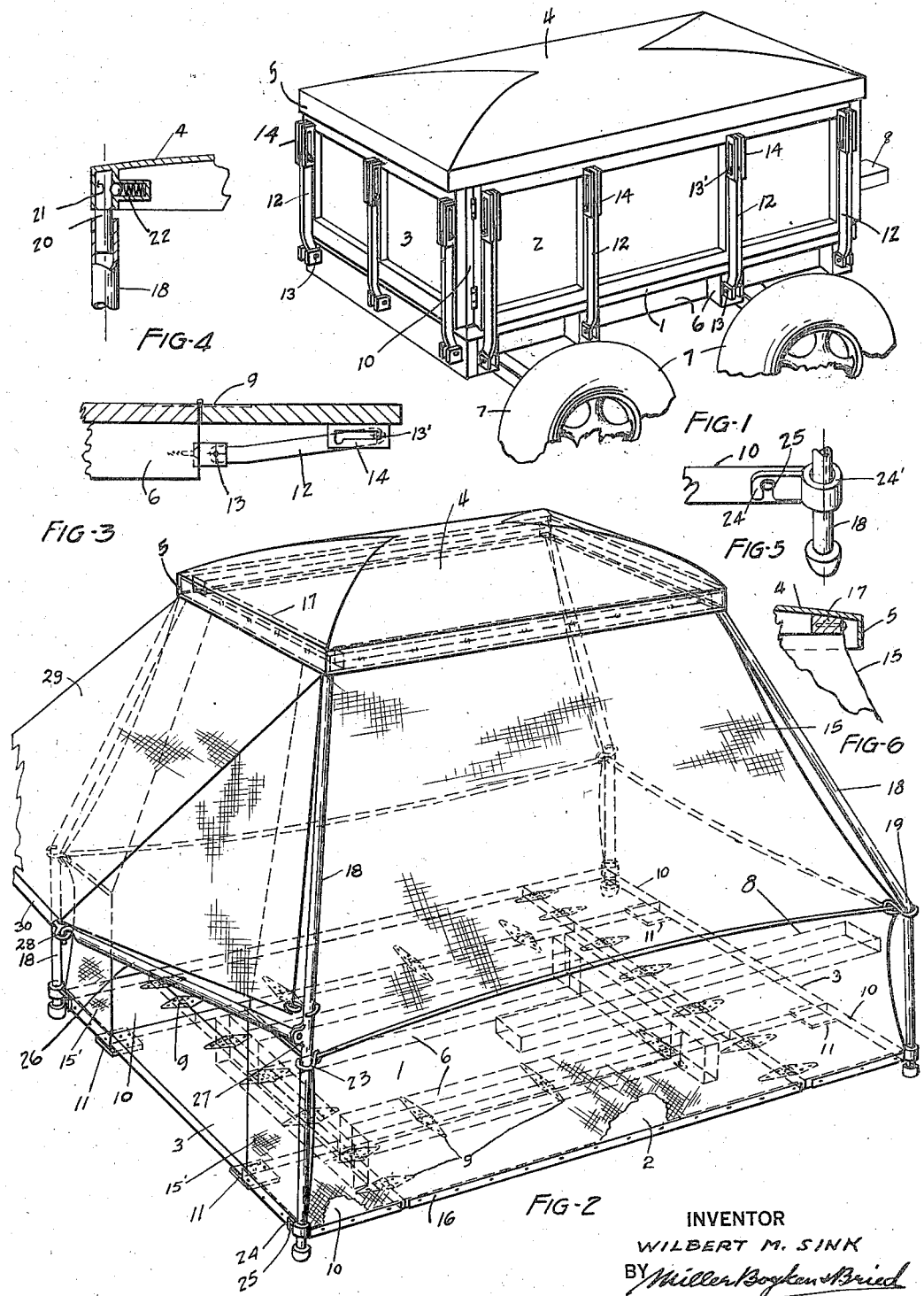
INVENTOR
WILBERT M. SINK
BY *Miller Boykin Bried*
ATTORNEY Patented Oct. 13, 1936

2,057,252

UNITED STATES PATENT OFFICE 2,057,252

FOLDING TENT HOUSE

Wilbert M. Sink, San Francisco, Calif.

Application May 7, 1935, Serial No. 20,165

11 Claims. (Cl. 135—1)

This invention relates to folding tent houses of the type adapted to cooperate with the body of an automobile trailer so as to fold up into the body, and the principal object of the invention is to provide improvements in this type of folding tent house which will have an extraordinarily large floor space when outfolded from the trailer, also such a tent house in which the four sides of the trailer as well as the corners outfold to form one continuous floor with the regular bottom of the trailer body, and which floor when outfolded will be perfectly rigid and strong without the use of supporting legs or ground supports of any kind so that the entire outfolded house may be moved bodily on the trailer wheels if desired. Other features consist in having all canvas walls permanently secured top and bottom with the roof and floor so that there is substantially no assembling to be done, four corner posts being the only loose or separate parts. Other features and advantages of the invention will appear in the following description and on the accompanying drawing.

In the drawing Fig. 1 is a perspective view of my folding tent house as completely folded up within the body, or rather forming the body of an automobile trailer having four wheels.

Fig. 2 is a perspective view of the tent house completely outfolded or "set up", the wheels of the trailer being omitted and the various junctures of the parts of the tent house being dotted through the canvas walls, also the entrance canopy broken away.

Fig. 3 is an enlarged detail elevation showing the outfolded position of one of the folding floor supporting bracket arms.

Fig. 4 is an enlarged sectional elevation showing the upper corner socket and corner post connection.

Fig. 5 is an enlarged detail showing the sliding hook on the lower part of the corner posts and by which the walls of the tent are vertically tensioned.

Fig. 6 is a fragmentary section at the edge of the roof showing the connection of the canvas walls thereto.

In further detail the trailer body is shown as comprising a bottom 1, side walls 2, end walls 3, and a sheet metal cover or roof 4 having a downwardly extending margin or flange 5 overlapping the side and end walls so as to hold all together in folded position. The bottom is supported on transverse and/or longitudinal joists as at 6 and all suitably mounted on road wheels 7 and provided with a trailer hitch as at 8 for towing behind an automobile in the usual way.

The side and end walls are hinged to the trailer bottom or floor as by numerous large strap hinges 9 preferably countersunk into the surface of the members, and at opposite ends of both side walls 2 are smaller square sections 10 similarly hinged to the side walls so as to fold outwardly to fill in the otherwise lacking corners of the floor when extended to erect the tent. When outfolded these corner sections 10 find support on plates 11 secured to the end walls and projecting under the corner sections, while the side and end walls are all supported in horizontal extension by a plurality of bracket arms 12 which are pivotally connected at their lower ends to the joists 6 as at 13 and at their upper 13' or outer ends by a sliding connection such as a transverse pin or lug on the arm engaging in a pair of slotted plates or channel-shaped connection 14 secured to the side or end wall as the case may be. On account of the depth of the joists this arrangement gives a plurality of angular brace arms of great rigidity when extended, yet all fold up automatically along the sides of the trailer body to the position shown in Fig. 1.

The canvas walls 15 are preferably permanently secured along upper and lower margins respectively to the margins of the roof member 4 and edges of the floor as indicated, the latter being covered with a thin metal protective strap 16 and the upper connection being made to strips 17 spaced inwardly from roof flange 5 so as not to interfere with the roof section overlapping the side walls when the tent house is folded up. The short free ends only of the corner floor sections are not attached to the canvas at the forward or closed end of the tent so that they are free to fold inwardly at right angles to the side walls as are the corner floor sections at the door end of the tent which are attached to a narrow width of canvas 15' at the sides of the door opening.

The roof section 4 is supported in elevated position and with the canvas walls tensioned, by means of four corner posts 18. These posts are preferably made of piping bent at 19 to form vertical lower walls of the canvas and slanted walls above that point, and the upper ends are fitted with square or flattened plugs 20 which fit into sockets 21 secured to the roof section and which sockets are each preferably provided with a spring detent 22 which springs into a groove or notch in the plug to temporarily keep the post from falling out of the socket in erecting the tent house.

Adjacent the bend 19 the canvas walls are provided with hooks 23 which engage over the corner posts, and adjacent the bottom of the posts is a sliding hook 24 which hooks over firm headed pins or bolts 25 projecting from the corner floor sections 10. The ring-like portions 24' of these hooks fit freely on the pipes 18 and have sharp edges so that they will engage the pipe and bind when canted upwardly, all so that each corner post may be separately pushed upward to put any desired tension on the tent walls and it will bind in the hook ring so that it cannot slip down again unless the ring portion of the hook is knocked up to release it. The corner posts have a knob.

One end of the tent walls may be partially open to provide a doorway, and this is protected by an outwardly projecting flap or canopy 29, held out by a pair of brace arms 26 pivoted at their inner ends to the adjacent corner posts as at 27 and hooked at their outer ends through holes as at 28 in the end of a rod 30 in the outer margin of the canopy. Thus, the canopy may be unhooked and closed down over the doorway at night.

By the above construction it will be seen that the tent house when set up is complete without the requirement of ground supports or braces, also that it may easily be erected in a few minutes by one man and without the use of tools, also that it provides an unusually large floor area, in fact with side walls equal to half the width of the fixed body bottom, the extended floor will be twice the original width of the trailer body and about half again as long.

Also to be observed is that although the canvas walls all fold into the body when closed up, there is plenty of room in it for a couple of beds and other furnishings and luggage, and all are protected by the metal top when folded so that when opened up again the next summer no deterioration will have been suffered by the contents.

It will be evident to those skilled in the art that minor changes may be made in the structure described, within the spirit of the invention and as covered in the appended claims.

I claim:—

1. A folding tent house mounted on a trailer vehicle and comprising a fixed floor and upright side and end walls forming a box body, said side and end walls hinged to said fixed floor in a manner to swing outward to form a horizontal flush extension of the fixed floor on all four sides thereof, and bracket arms pivotally connected at one end each to the fixed floor structure below the floor level and at the other ends each to the outer sides of the side and end walls respectively in a manner to support the side and end walls in horizontal extension.

2. A folding tent house mounted on a trailer vehicle and comprising a fixed floor and upright side and end walls forming a box body, said side and end walls hinged to said fixed floor in a manner to swing outward to form a horizontal flush extension of the fixed floor on all four sides thereof, bracket arms pivotally connected at one end each to the fixed floor structure below the floor level and at the other ends each to the outer sides of the side and end walls respectively in a manner to support the side and end walls in horizontal extension, and corner floor sections each hinged to one of the wall sections arranged to outfold to complete the outfolded floor to rectangular form and ledges on other outfolded wall sections supporting said outfolded corner floor sections respectively.

3. A folding tent house mounted on a trailer vehicle and comprising a fixed floor and upright side and end walls forming a box body, said side and end walls hinged to said fixed floor in a manner to swing outward to form a horizontal flush extension of the fixed floor on all four sides thereof, bracket arms pivotally connected at one end each to the fixed floor structure below the floor level and at the other ends each to the outer sides of the side and end walls respectively in a manner to support the side and end walls in horizontal extension, corner floor sections each hinged to one of the wall sections arranged to outfold to complete the outfolded floor to rectangular form, and means cooperating with the adjacent wall section supporting said corner floor section in outfolded position.

4. In a structure as specified in claim 1, a roof section adapted to fit over the trailer body, canvas walls secured at their upper edges to said roof section, and at their lower edges to the edges of the outfolded floor in a manner whereby the walls will all fold up inside the body when closed and covered with the roof section.

5. In a structure as specified in claim 1, a roof section adapted to fit over the trailer body, canvas walls secured at their upper edges to said roof section, and at their lower edges to the edges of the outfolded floor in a manner whereby the walls will all fold up inside the body when closed and covered with the roof section, corner posts arranged for supporting said roof section when the tent house is set up, sockets carried by the roof section into which the upper ends of said corner posts fit, and means for detachably securing the lower ends of the corner posts to the corners of the extended floor.

6. In a structure as specified in claim 1, a roof section adapted to fit over the trailer body, canvas walls secured at their upper edges to said roof section, and at their lower edges to the edges of the outfolded floor in a manner whereby the walls will all fold up inside the body when closed and covered with the roof section, corner posts arranged for supporting said roof section when the tent house is set up, sockets carried by the roof section into which the upper ends of said corner posts fit, and means for adjustably and detachably securing the lower ends of the corner posts to the corners of the extended floor whereby the posts may be raised or lowered to vary the tension on the canvas walls.

7. In a structure as specified in claim 1, joists under said fixed floor and to which it is secured, said brackets each being pivotally connected to said joists at a point substantially below the floor, and severally connected at their outer ends by means forming a limited sliding connection with the side and end walls respectively, the arrangement providing an angular bracing relation of the brackets rigidly supporting the extended floor.

8. In a folding tent house, a fixed floor and extension sections of floor hinged thereto foldable from a plane therewith to a vertical position, joists under said fixed floor and to which it is secured, brackets each pivotally connected at one end to a joist at a point substantially below the floor, and connected at the outer end by means forming a limited sliding connection with an extension section of floor, the arrangement providing an angular bracing relation of the brackets rigidly supporting the extended floor.

9. In a structure as specified in claim 1, a roof section adapted to fit over the trailer body, canvas walls secured at their upper edges to said roof section, and at their lower edges to the edges of the outfolded floor in a manner whereby the walls will all fold up inside the body when closed and covered with the roof section, corner posts arranged for supporting said roof section when the tent house is set up, sockets carried by the roof section into which the upper ends of said corner posts fit, means for detachably securing the lower ends of the corner posts to the corners of the extended floor, said corner posts being bent to form a vertical portion at the lower portion of the tent house and an inwardly slanted portion extending to the roof, and means for securing the canvas walls to said corner posts.

10. In a structure as specified in claim 1, a roof section adapted to fit over the trailer body, canvas walls secured at their upper edges to said roof section, and at their lower edges to the edges of the outfolded floor, said canvas walls being all foldable up inside the body when closed and covered with the roof section, corner posts arranged for supporting said roof section when the tent house is set up, sockets carried by the roof section into which the upper ends of said corner posts fit, means for detachably securing the lower ends of the several corner posts to the corners of the extended floor, comprising a clamp at each corner embracing one of the corner posts, said clamp formed and adapted for vertical adjustment of the post therethrough to tension the canvas walls.

11. In a structure as specified in claim 1, a roof section adapted to fit over the trailer body, canvas walls secured at their upper edges to said roof section, and at their lower edges to the edges of the outfolded floor in a manner whereby the walls will all fold up inside the body when closed and covered with the roof section, corner posts arranged for supporting said roof section when the tent house is set up, sockets carried by the roof section into which the upper ends of said corner posts fit, means for detachably securing the lower ends of the corner posts to the corners of the extended floor, a doorway at one side of the tent house with a canvas canopy thereover, and means for supporting said canopy in outward extension comprising a pair of rods pivotally connected at one end each with one of the corner posts and at the other end with the outer margin of said canopy.

WILBERT M. SINK.